United States Patent [19]

Conder et al.

[11] Patent Number: 4,662,958

[45] Date of Patent: May 5, 1987

[54] METHOD OF MAKING A CERAMIC EVACUATABLE ENCLOSURE

[75] Inventors: Philip C. Conder; Richard M. Jenkins; James R. Redding, all of Malvern, England

[73] Assignee: The Secretary of State for Defence in Her Britannic Majesty's Government of the United Kingdom of Great Britain and Northern Ireland, London, England

[21] Appl. No.: 673,757

[22] PCT Filed: Feb. 20, 1984

[86] PCT No.: PCT/GB84/00049

§ 371 Date: Nov. 5, 1984

§ 102(e) Date: Nov. 5, 1984

[87] PCT Pub. No.: WO84/03695

PCT Pub. Date: Sep. 27, 1984

[30] Foreign Application Priority Data

Mar. 18, 1983 [GB] United Kingdom ................. 8307571

[51] Int. Cl.⁴ .......................... B32B 18/00; B32B 31/26
[52] U.S. Cl. .................................... 156/89; 156/304.2; 228/193; 228/195; 228/196; 264/56; 264/66
[58] Field of Search ...................... 156/89, 304.2, 292; 228/193, 195, 903, 196; 65/36, 42; 29/463, 505; 264/56, 58, 65, 66

[56] References Cited

U.S. PATENT DOCUMENTS

| | | | |
|---|---|---|---|
| 2,756,892 | 7/1956 | Bleuze et al. | 156/304.2 |
| 3,239,323 | 3/1966 | Folweiler | 156/89 |
| 3,789,499 | 2/1974 | Pequignot | 228/193 |
| 3,982,204 | 9/1976 | Andringa | 331/94.5 D |
| 4,241,319 | 12/1980 | Papayoanou | 331/94.5 G |

FOREIGN PATENT DOCUMENTS

| | | | |
|---|---|---|---|
| 2839353 | 2/1980 | Fed. Rep. of Germany . | |
| 136184 | 10/1980 | Japan | 156/89 |
| 705003 | 3/1954 | United Kingdom . | |
| 719611 | 12/1954 | United Kingdom . | |
| 1097747 | 1/1968 | United Kingdom | 156/89 |

OTHER PUBLICATIONS

"Engineering Ceramics—When to Use Them", Design Engineering, Nov. 1977, pp. 79–82.
R. P. Harrison, "Report on the Ultrasonic Inspection of Two Bonded Ceramic Components", Fullmer Technical Services.

Primary Examiner—Caleb Weston
Attorney, Agent, or Firm—William R. Hinds

[57] ABSTRACT

A ceramic evacuatable enclosure (10, 30, 42) such as a laser body is made by the following process. A first body portion (12, 41) is formed with a channel (18, 19, 20, 43, 45, 46) and second body portion (11, 31, 40) of the same ceramic material is provided. Mating surfaces are polished on the body portions (11, 12) for bonding together by thermocompression below the ceramic distortion temperature to achieve a vacuum seal. The ceramic may be alumina including 0.2 to 12% by weight of vitreous material. The thermocompression temperature may be in the range 1200° C. to 1750° C. Polishing is performed to a finish of from 0.01 μm to 0.15 μm. The body portions (11, 12) may have similar surface formations mutually aligned to provide a folded cavity (18, 19, 20) for an alumina waveguide $CO_2$ laser.

14 Claims, 4 Drawing Figures

METHOD OF MAKING A CERAMIC EVACUATABLE ENCLOSURE

This invention relates to a ceramic evacuatable enclosure.

Ceramic evacuatable enclosures are required for example for laser waveguides and other optical and electronic devices such as vacuum tubes. Ceramic laser waveguides are known, and comprise a ceramic enclosure in the form of a waveguide cavity in a ceramic material such as alumina ($Al_2O_3$). For acceptable performance efficiency, the waveguide cavity requires an accurately linear longitudinal axis, a constant cross-section and a high quality internal surface finish. Furthermore, to achieve and maintain laser action in the waveguide cavity, it must contain a mixture of gases in specific relative proportions at low pressure. The proportions and pressure must be maintained over the working life of the device. These criteria apply particularly to $CO_2$ laser waveguides formed in alumina.

A number of techniques have been investigated and applied to the production of $CO_2$ laser waveguides. One such technique is to employ an ultrasonic drill to machine a laser bore in an alumina block. Laser waveguide cavities have been fabricated with bores of 1 to 2 mm in diameter and 250 mm in length. Straightness has been achieved to camber of less than $10^{-3}$ (ratio of mid-bore centre deviation from colinearity with the line of bore end centres to bore length). Good bore surface finish and acceptable constancy of cross-section have also been achieved, with good leak-tightness for retention of the laser gas medium. However, laser output power varies approximately in proportion to cavity length, and cavity machining accuracy worsens rapidly with increasing drilling length. The limit of bore length which retains acceptable cavity accuracy is probably not greater than 350 mm, which sets an upper limit to the maximum laser power obtainable. In fact, all ultrasonic drilling of the standard required for laser cavities is time consuming and expensive. For some applications requiring high power compact lasers, a folded-path waveguide structure would be desirable. This is not technically practicable by ultrasonic drilling, since it imposes very stringent bore alignment criteria.

It is also known to produce a ceramic waveguide in the form of a covered channel. A waveguide channel is formed in a ceramic substrate, and a cover is placed over the channel. The substrate and cover are then clamped together. This arrangement is not leak-tight, and a surrounding vacuum vessel is required to contain the laser gas medium communicating with the waveguide cavity. Excitation electrode connections and the laser light path must pass through the outer vessel, resulting in an undesirably complex and bulky structure.

It is well known to join together ceramic components to form composite structures. Earthenware articles such as crockery may be provided with handles etc by treating surfaces to be joined with a slip or aqueous suspension of their constituent clay. This is not appropriate for insoluble ceramics or where precision geometries are required. Glazes or ceramic to metal seals may also be employed. In particular, Allen and Borbidge describe alumina to platinum bonding in J. Mat. Sci. 18 (1983) pp 2835-2843. However, both glazes and ceramic to metal seals have the disadvantage that their joints produce an inhomogeneity or discontinuity of composition between the parts being joined, leading to difficulties and weaknesses due to differential thermal expansion. Moreover, particularly in the case of the production of cavities by glazing, it is difficult to avoid the glaze material flowing into the cavity region from the joint. A further drawback in the case of a ceramic to metal seal is the problem that an electrically conducting region is produced which affects the electrical insulation of the joint. These disadvantages are particularly serious in the case of an alumina laser waveguide, which requires an accurate, vacuum tight, optically homogeneous bore clear of extraneous sealing materials and providing electrical insulation.

It is an object of the present invention to provide an alternative method of making a ceramic evacuatable enclosure.

The present invention provides a method of making a ceramic avacuatable enclosure including the steps of:

1. providing two body portions of substantially the same ceramic material and defining at least part of the enclosure when bonded together,
2. polishing mating surfaces on the body portions, and
3. bonding together the mating surfaces of the body portions by thermo-compression below the ceramic distortion temperature to achieve a gas leak-tight seal.

For the purposes of this specification, the ceramic distortion temperature is defined as that temperature at which distortion exceeds a given tolerance limit when a ceramic of a given composition is fired for a given time under a given pressure in a given mounting arrangement.

The method of the invention has the advantage that the internal dimensions of the enclosure are not limited by a maximum drilling length or to a circular cross-section. It has been found that a ceramic waveguide made in accordance with the invention exhibits gas leak-tight properties which do not degrade significantly with thermal cycling in use. Moreover, the enclosure is chemically, electrically and optically homogeneous. The invention is also capable of providing enclosures having folded internal cavities, which cannot be made by drilling techniques. The enclosure may be formed by grinding a channel in one of the body portions with a grinding wheel having an appropriate cross-section.

In a preferred embodiment, the ceramic material includes a minor proportion of vitreous phase material of different chemical composition.

The ceramic material may be alumina, and the evacuatable enclosure a $CO_2$ laser waveguide. The enclosure may be formed by providing a respective channel in each body portion for prebonding alignment in order to produce an enclosure having a bore consisting of the combined channel cross-sections. A circular section waveguide may be formed in this way from semicircular channels formed in respective body portions.

The body portions may be provided with a plurality of channels disposed for subsequent alignment and bonding to form a body having a combined bore. The combined bore may be folded and comprise a plurality of individual bores connected together; in the case of a laser waveguide, mirrors are provided which are aligned appropriately to reflect radiation from one bore to another. The mirrors are preferably attached in a vacuum tight manner to the body to obviate optical and gas seal difficulties associated with the provision of windows to the interior of the waveguide. The longitudinal axes of the waveguide bores may be coplanar.

Conveniently, the ceramic material of the waveguide is alumina. Polishing in step 2 is carried out to a surface roughness in the range 0.015 to 0.15 $\mu$m. The body portions may be placed in contact and bonded by thermo-compression at a temperature in the range 1200° C. to 1750° C. It has been found that bonding is facilitated by employing an alumina material containing 0.2 to 12%, preferably 2 to 4%, by weight of vitreous phase material of different chemical composition.

In order that the invention might be more fully understood, embodiments thereof will now be described, by way of example only, with reference to the accompanying drawings, in which.

Figure 1:
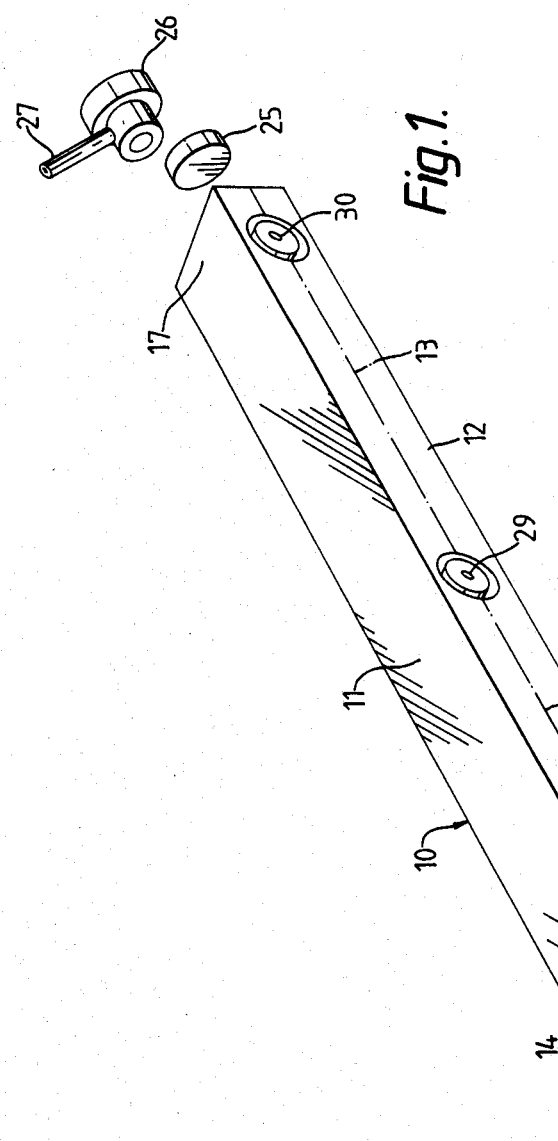
FIG. 1 is a perspective view of a $CO_2$ waveguide laser made in accordance with the invention, peripheral components being shown withdrawn from their attachment points.
Figure 2:
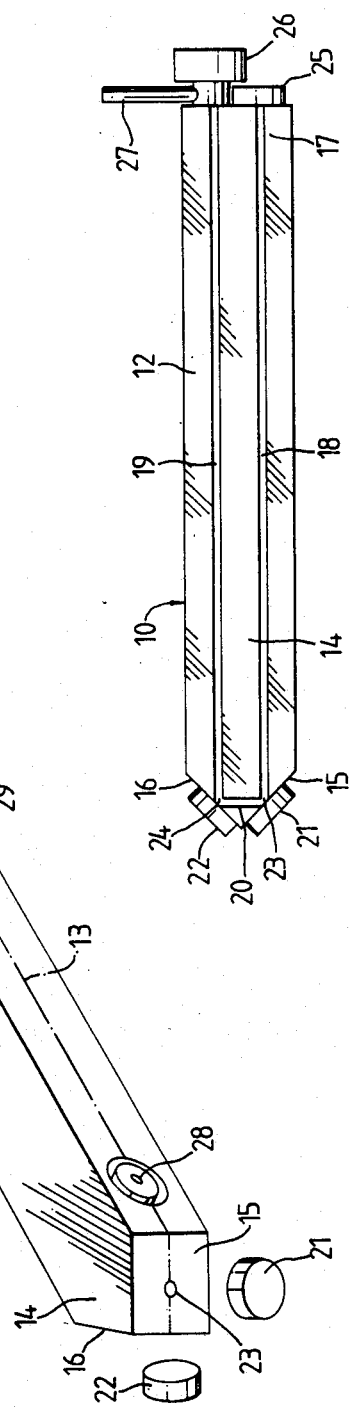
FIG. 2 is a plan view of the FIG. 1 waveguide after removal of the upper body portion.

Referring to FIGS. 1 and 2, a ceramic enclosure providing a $CO_2$ laser waveguide is indicated generally by 10. The waveguide 10 has upper and lower body portions 11 and 12 respectively. They are joined together as indicated by chain lines 13. The waveguide 10 has a wedge-shaped longitudinal end portion 14 having oblique surfaces 15 and 16, and a rectangular block end portion 17.

Active laser bore sections 18 and 19 connected by a passive section 20 are formed in the waveguide 10, each bore section comprising upper and lower semicircular half-sections (not shown) produced by grinding the upper and lower body portions 11 and 12 respectively. The bores 18 and 19 have longitudinal axes intersecting that of the bore 20 at right angles at points on the surfaces of mirrors 21 and 22. The total active length of the laser is 268 mm, each of the bores 18 and 19 being 134 mm in length. The mirrors 21 and 22 are of diamond-turned copper, and are fully reflective. They are sealed to the oblique surfaces 15 and 16 over holes 23 and 24 centred at the intersections of the bores 18 and 20 and 19 and 20 respectively. Active bore section 18 is closed by a third fully reflective mirror 25 at the waveguide end portion 17. Active bore section 19 is closed by a partially reflective mirror in an adjustable mount (not shown). The mirror and mount are incorporated in a gas pumping stem 26 having an output pipe 27.

The laser bores 18, 19 and 20 are filled with the conventional $CO_2$ laser gas mixture, He/$CO_2$/$N_2$/Xe in the proportions 16/8/4/1 at a pressure of 90 torr. Three DC excitation electrodes are provided for each of the active laser bores, as shown in FIG. 1 at 28, 29 and 30 for the bore 18 (electrodes are not shown in FIG. 2).

The $CO_2$ laser waveguide shown in FIGS. 1 and 2 was constructed as follows. The upper and lower body portions 11 and 12 were formed from two separate alumina slices having dimensions 6.5 mm × 20 mm × 172 mm. The alumina had nominal ceramic and vitreous phase contents of 97% and 3% respectively. The density was 3.7 g.cm$^{-3}$ and the grain size 12 $\mu$m. Two parallel semicircular channels 1.5 mm in diameter were ground in each of the substrate surfaces with a grinding wheel having a semicircular edge. The mating surfaces of the body sections 11 and 12 were optically polished by conventional grinding, lapping and polishing techniques to a surface roughness in the range 0.01 to 0.15 $\mu$m. The portions 11 and 12 were then arranged one on top of the other, so that each pair of bore half-sections were accurately aligned and in contact to form a respective circular bore. Two ceramic location pins were inserted in holes (not shown) extending through the portions 11 and 12 perpendicular to the plane of the bores 18 to 20. A few tens of grams weight was placed on the upper body portion to achieve light compression, and the assembly was heated in air at 1400° C. for one hour. A weight would not of course be necessary if the upper body portion were sufficiently heavy. When the laser bores 18, 19 and 20 were sealed, the waveguide proved to be leak-tight to better than $10^{-10}$ mbar.liter.sec$^{-1}$, this being the sensitivity limit of the helium mass spectrometer leak tester employed. Furthermore, the accuracy of machining of the bore half-sections was preserved through the bonding process, so that constancy of cross-section, bore straightness and alignment were retained.

DC high tension excitation electrodes were provided in the active laser bores 18 and 19 via machined ports. In this example, a prototype, the electrodes were sealed with epoxy resin. In an example to be described later, a surface metallisation and brazing procedure is set out.

The three fixed mirrors 21, 22 and 25 were attached to the waveguide body in a gas-tight manner, after accurate alignment with a He-Ne laser test system. The pumping stem with incorporated tunable mirror was subsequently attached, and the laser pumped out and filled with the gas mixture previously mentioned.

For the purpose of testing, the laser was mounted on an aluminium alloy water-cooled heat sink. DC excitation was employed to achieve laser action in the active bores 18 and 19. The central electrode (e.g. electrode 29 in bore 18) of each triplet in the respective bore 18 or 19 was run at earth potential. The breakdown and maintenance voltages were fed via 1 Mohm resistors to the outer electrodes 28 and 30 for bore 18 and the equivalent (not shown) for bore 19.

A continuous wave power output of 4.0 watts was achieved with the $CO_2$ laser at a wavelength of 10.6 $\mu$m. This was attained using the previously mentioned mixture of He/$CO_2$/$N_2$/Xe in the proportions 16/8/4/1 at 90 torr. Discharges of 3 mA at 4.5 kV were employed in each active section 18 and 19 with an 8% output coupler. Measurements indicated an output signature flat to within 15% with an output intensity profile of the quasi-gaussian $EH_{11}$ waveguide mode. It is anticipated that higher output power would be achievable with greater accuracy of alignment of the fixed mirrors 21, 22 and 25. In operation, the laser did not show any significant degradation in mechanical strength of the bond 13 or its vacuum integrity under thermal cycling.

In order to test the applicability of the invention to a range of alumina ceramics, specimens materials in the form of ASTM test pieces were tested having differing ceramic and vitreous alumina constituents. The results are shown in Table 1. Three commercial aluminas (Deranox, trade name) were tested. These were of pharmaceutical grade and had nominal alumina contents of 99.5%, 97.5% and 97% with respective vitreous contents of nominally 0.25%, 2.5% and 3% by weight. Similar ceramic materials such as aluminas with varying vitreous content are considered to be substantially the same material for the purposes of this specification. The vitreous phase in alumina arises from a combination of residual impurities and processing additives such as oxides of silicon, calcium and magnesium. The 97% and 97.5% alumina specimens produced good leak-tight seals after heating to a maximum temperature of 1400°

C. for 1 hour. Bonding of 99.5% alumina test pieces was also carried out with heating at the higher temperature of 1600° C. for 60 minutes. This resulted in some successful and some unsuccessful bonds. Additional trials of 99.5% alumina at 1710° C. for 60 minutes produced leak-tight bonds. This indicates that the lower the proportion of the vitreous content the higher the temperature required to produce bonding. The preferred temperature range is 1350° C. to 1450° C. for 96 to 98% aluminas, since this is well below the ceramic distortion temperature but adequately bonds those aluminas. For high alumina content material, around 99.5%, the preferred temperature range is 1650° C. to 1750° C.

The temperature at which a ceramic distorts varies with the vitreous content and composition, the firing time, the pressure and the mounting arrangement. Moreover, tolerance limits and therefore acceptable degrees of distortion vary depending on the accuracy required. Accordingly, the distortion temperature is a fixed quantity only when other parameters are defined.

In order to maintain the original machining accuracy of alumina parts to be bonded, the maximum bonding temperature is 1750° C. for 99.5% alumina, which dictates a minimum vitreous alumina content of 0.2% for the low compressive forces employed. The maximum bonding temperature for 97% and 97.5% would be lower. Acceptable bonding is unlikely to take place below 1200° C. unless the vitreous alumina content were to be too large for acceptable ceramic quality. Accordingly, the preferred bonding temperature range is 1200° C. to 1750° C., the bonding temperature being increased to compensate for reduction in vitreous content. Alternatively, bonding may be improved by heating for longer time periods or by increasing the pressure urging together parts to be bonded. Workers skilled in the ceramic art would perform simple bonding test as described in order to determine the bonding conditions appropriate to any particular ceramic composition. As has been described, aluminas with nominal vitreous contents of 2.5% and 3% provided good leak-tight bonds after heating at 1400° C. for 60 minutes.

the physical properties required in laser waveguides and other electrical and microwave devices. A greater vitreous proportion than this results in alumina of quality too poor for laser waveguides and other uses.

Bonded specimens of 97.5% and 97% alumina as referred to in Table 1 were sectioned through the bond to study its structure. Optical microscopy indicated that the bond was homogeneous and confined to the mating surfaces, unlike glazing or metallising processes. Optical homogeneity is particularly valuable for alumina waveguide $CO_2$ lasers, since the optical properties of alumina at the $CO_2$ laser wavelength enhance the waveguide properties considerably.

It should be noted that the invention is quite distinct from hot isostatic pressing well-known in ceramic powder technology for compaction and reaction purposes. Hot pressing requires temperatures well above the ceramic deformation temperature combined with very high pressures. Hot pressing of alumina would require a temperature well above 1750° C. at a pressure in the order of 2 Kilobars. In contradistinction, the invention may be implemented with only a light pressure urging together the surfaces to be bonded. Moreover, heating is at temperatures below the ceramic distortion temperature, a major advantage since it allows preservation of pre-bonding machining accuracy through the bonding process.

Figure 3:
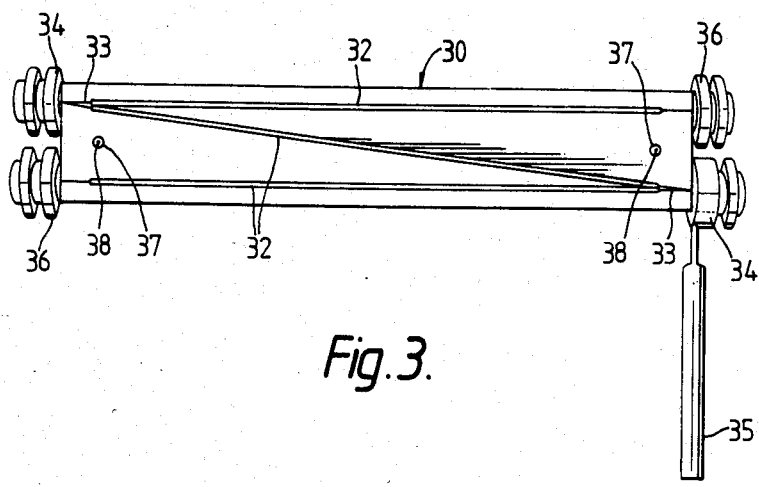
FIG. 3 is a plan view of a Z-fold laser waveguide illustrating external excitation electrodes.

Referring now to FIG. 3, there is shown an external plan view of a further $CO_2$ laser 30 made of 97% alumina in accordance with the invention. The laser 30 has an upper body portion 31. The ceramic-ceramic bond and lower body portion are not visible, being parallel to and below the upper body portion 31 in the direction into the plane of the drawing. The upper body portion has external ground channels 32 which are metallised to form electrodes for radio frequency transverse excitation of the $CO_2$ laser medium. The lower body portion has complementary electrodes in its surface (not shown). The laser cavity is immediately below the channels 32 separated by a wall thickness of 1 mm from the electrode metallisation. As can be inferred from the

| Number of Specimens | 16 | 4 | 8 |
| --- | --- | --- | --- |
| Nominal Al$_2$O$_3$ Ceramic Phase Content by weight | 99.5% | 97.5% | 97% |
| Nominal Vitreous Phase Content by weight | 0.25% | 2.5% | 3.0% |
| Grain Size | 10 μm | 6 μm | 12 μm |
| Density | 3.9 g · cc$^{-1}$ | 3.79 g · cc$^{-1}$ | 3.7 g · cc$^{-1}$ |
| Surface Finish | 0.015–0.037 μm | 0.025–0.037 μm | 0.027–0.13 μm |
| Maximum Temperature | (a) 1400° C. (b) 1600° C. (c) 1710° C. | 1400° C. | 1400° C. |
| Time at Maximum Temperature | 60 mins | 60 mins | 60 mins |
| Leak Rate | (a) 6 samples failed to bond (b) 3 samples <10$^{-10}$ mbar · liter sec$^{-1}$ 3 samples failed to bond (c) 4 samples <10$^{-10}$ mbar · liter sec$^{-1}$ | <10$^{-10}$ mbar · liter sec$^{-1}$ | <10$^{-10}$ mbar · liter sec$^{-1}$ |
| Breaking Load | (a) failed to bond (b) bonded samples 95 kg (c) not tested | 60 kg | 450 kg |

The particularly preferred vitreous content range is 2% to 4%, since this combines comparative ease of bonding at temperatures well below the ceramic deformation temperature with relatively high ceramic quality.

A maximum vitreous alumina content of 12% by weight can be tolerated in alumina ceramic to achieve geometry of the channels 32, the laser cavity is Z-shaped and defined by three bores (not shown). Pairs of bores at the vertices of the Z are arranged to meet as indicated by lines 33 at the surface of mirrors (not shown) in mounts 34. One of the mounts 34 incorporates a vacuum pumping stem 35. The mirrors reflect laser light from one bore to a respective connected bore as described with reference to FIGS. 1 and 2. The laser cavity is terminated at either end by two further mirrors in mounts 36. Holes 37 formed in the upper body portion 31 contain ceramic pins 38 inserted prior to bonding to locate the laser body portions with respect to each other.

The mirror mounts 34 and 36 are attached to the laser 30 as follows. The ceramic surface is metallised by coating with a commercially available liquid suspension of molybdenum and manganese and firing at 1540° C. The metallised area is then built up with electroplated nickel, and each mount is attached to the respective area by high temperature brazing with a Cu/Ag or Cu/Au alloy. The mirror mounts 34 and 36 are of metal having a thermal expansion coefficient matched to the ceramic. For alumina, an Ni/Fe/Co alloy is suitable and commercially available. The total active length of the laser 30 is approximately 57 cm, and is defined by the region (not shown) under the electrode channels 32. This length is far greater than would be possible by prior art ultrasonic drilling techniques.

Since the laser bore contains a joint, (cf. FIGS. 1 and 2), the mirror mounts 34 and 36 must be attached at positions bridging the joint. It is a major advantage of the invention that metallising and brazing across the joint at high temperatures can be carried out without any detectable change in the joint. In particular, vacuum tightness showed no detectable change when measured on a helium mass spectrometer leak detector. Glazed or ceramic to metal joints would not be unaffected by such processing.

Figure 4:
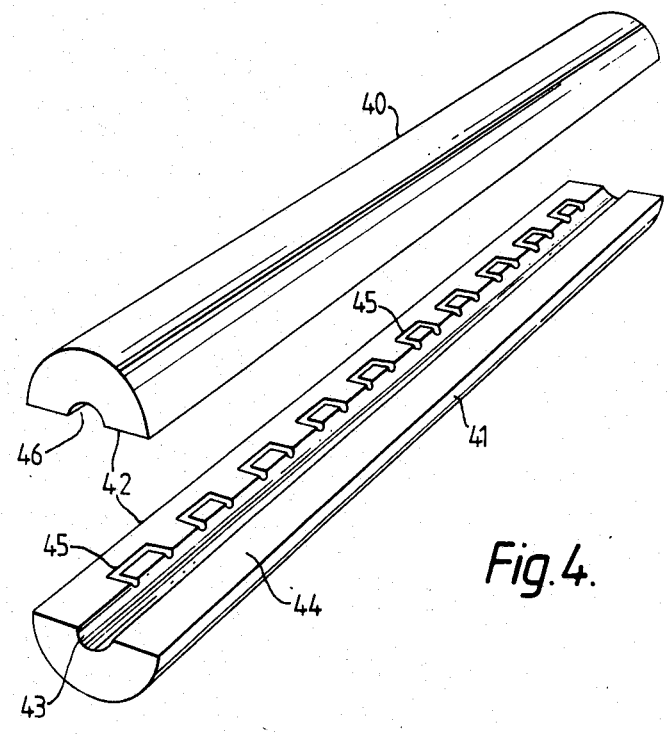
FIG. 4 is a perspective view of two body portions of a beryllia argon ion laser tube.

Referring now to FIG. 4, there is shown a perspective view of separated upper and lower body portions 40 and 41 of an Argon ion laser tube indicated generally by 42 for bonding together in accordance with the invention. The lower body portion 41 has a semicircular channel or bore section 43 ground in its upper surface 44, together with subsidiary channels 45 to provide gas recirculation paths. The upper body portion 40 has similar bore and recirculation path formations on its lower surface, only the bore formation 46 being shown. The body portions 40 and 41 are of 96% pharmaceutical grade beryllia (BeO) with a 4% vitreous content arising from residual impurities and processing additives. It is envisaged that the body portions 40 and 41 may be joined together in accordance with the invention to form a circular section bore with gas recirculation channels. Simple tests will be performed by those skilled in the art as previously indicated to identify the appropriate bonding conditions.

The construction of Argon ion lasers poses problems which have never been adequately solved in the prior art. A typical argon ion laser with a continuous output above 10 watts is ~0.1% efficient, requiring a current density of $>10^3$ Amps cm$^{-2}$ in 2 mm diameter bore at least 1 meter long. Early devices employed water cooled silica capillary tubes, but proved unreliable and short-lived due to ion bombardment erosion, rapid gas clean-up, poor thermal properties and tube failure. Beryllia is a superior construction material because of its high thermal conductivity facilitating dissipation of the heat produced by the laser discharge. Argon ion lasers incorporating beryllia are long lived, and have low gas clean-up rates. However, beryllia capillary tubing is not available in sufficiently long lengths, and cannot in any event incorporate integral gas recirculation paths such as 45 in the tube wall by any prior art machining technique. Such paths are required to reduce the pressure gradient produced in the laser gas medium by the pumping action of the electric discharge current. It is not particularly attractive to glaze or metal seal together the body portions 40 and 41, since the bonding material would be difficult to exclude from the bore and gas recirculation paths whilst retaining vacuum integrity. Moreover, such combinations of dissimilar materials produce failure-inducing stresses by differential thermal expansion, because of the heat produced in the laser discharge. It is considered that the invention would provide a comparatively straightforward means of joining together two beryllia body portions such as 40 and 41.

We claim:

1. A method of making a ceramic article from component parts, the method including the steps of:
   (1) providing two body components of substantially the same ceramic material, each component including a minor proportion of a vitreous phase material,
   (2) polishing mating surfaces of optical quality on the body components,
   (3) assembling the body components such that their mating surfaces are in contact and urged together, and
   (4) heating the assembled body components sufficiently to produce a leak-tight gas seal between the mating surfaces, heating being carried out at temperatures below that at which deformation of the body components occurs, wherein, prior to sealing the said mating surfaces, at least one of the said two body components is at least partly preformed accurately to close tolerance which is preserved through heating in step (4).

2. A method according to claim 1 wherein polishing in step (2) is carried out to a surface finish in the range 0.01 to 0.15 μm.

3. A method according to claim 2 wherein the said proportion of vitreous phase material is in the range 0.2 to 12% by weight and heating in step (4) is carried out at a maximum temperature appropriate to the vitreous content and in the range of 1200° C. to 1750° C.

4. A method according to claim 3 wherein the proportion of vitreous phase material is in the range 2 to 4% by weight.

5. A method according to claim 1 wherein at least one of the body components is formed with a concave region adjacent at least one mating surface region, such that, after heating in step (4), the sealed body components define an evacuatable cavity.

6. A method according to claim 5 wherein the concave region is a groove.

7. A method according to claim 6 wherein the groove is formed by a grinding process.

8. A method according to claim 5 wherein both body components are formed with concave regions, and prior to step (3) the concave regions are aligned as appropriate to define an evacuatable cavity in the ceramic article when the body components are sealed in step (4).

9. A method according to claim 8 wherein the concave regions are grooves.

10. A method of making a ceramic article from component parts, the method including the steps of:
    (1) providing two body components of substantially the same ceramic material, the ceramic material including a minor proportion of a vitreous phase material, (2) polishing mating surfaces on the body components, (3) assemblying the body components such that the mating surfaces are in contact and urged together, (4) heating the assembled body components sufficiently to produce a leak-tight gas seal between the mating surfaces, heating being carried out at temperatures below that at which deformation of the body components occurs, and (5) applying a metallisation layer to the assembled body components by a firing procedure, the metallisation layer covering a region of the mating surfaces seal produced in step (4).

11. A method according to claim 10 including the step of brazing a metal component to the metallisation layer.

12. A method of making a ceramic article from component parts, the method including the steps of:

(1) providing two body components of substantially the same ceramic material, each component having a minor proportion of vitreous phase material and both components having mating surfaces polished thereon, at least one of which surfaces has a plurality of channels disposed as appropriate to provide a folded cavity, (2) assembling the body components such that their mating surfaces are in contact and urged together, and (3) heating the assembled body components sufficiently to produce a leak-tight gas seal between the mating surfaces, heating being carried out at temperatures below that at which deformation of the body components occurs.

13. A method of making a ceramic article from component parts, the method including the steps of:

(1) providing two body components of substantially the same ceramic material, each component including a minor proportion of vitreous phase material and both components having mating surfaces polished thereon, at least one of which surfaces has a main channel and at least one subsidiary channel communicating at both ends with the main channel, (2) assembling the body components such that their mating surfaces are in contact and urged together with the said main and subsidiary channels covered, (3) heating the assembled body components sufficiently to produce a leak-tight gas seal between the mating surfaces, heating being carried out at temperatures below that at which deformation of the body components occurs.

14. A method of making a ceramic article from component parts, including the steps of (1) providing two body components of substantially the same ceramic material, each component having a surface polished to optical quality for mating with the other component, (2) assembling the body components together without intervening materials and with their mating surfaces in contact and urged together, at least one of the body components being pre-engineered to accurate engineering standards to provide at least one depression in its polished mating surface, and heating the assembled components using a length of time, temperature and pressure insufficient to degrade engineering accuracy but sufficient to provide a vacuum seal between the body components.

* * * * *